United States Patent
Goode

(10) Patent No.: US 9,468,341 B1
(45) Date of Patent: Oct. 18, 2016

(54) BEVERAGE MIXING CONTAINER

(71) Applicant: Alexander Goode, North Hollywood, CA (US)

(72) Inventor: Alexander Goode, North Hollywood, CA (US)

(*) Notice: Subject to any disclaimer, the term of this patent is extended or adjusted under 35 U.S.C. 154(b) by 0 days.

(21) Appl. No.: 14/544,168

(22) Filed: Dec. 5, 2014

(51) Int. Cl.
  *B01F 11/00* (2006.01)
  *A47J 43/27* (2006.01)

(52) U.S. Cl.
  CPC .................................... *A47J 43/27* (2013.01)

(58) Field of Classification Search
  CPC ..... A47J 43/27; B65D 23/10; B65D 23/104; B65D 23/102
  USPC ....... 220/568, 592.16, 710.5, 752, 755, 771, 220/4.27; 366/130; 206/219; 215/384, 396, 215/398, 397, 399
  See application file for complete search history.

(56) References Cited

U.S. PATENT DOCUMENTS

| | | | | |
|---|---|---|---|---|
| 2,500,611 | A * | 3/1950 | Kereluck | 99/508 |
| 3,327,911 | A * | 6/1967 | Candito | 222/572 |
| D503,304 | S * | 3/2005 | Fiedeler | D7/300.1 |
| 6,913,159 | B1 * | 7/2005 | Goldberg | 215/396 |
| 8,372,457 | B2 * | 2/2013 | Delpierre et al. | 426/120 |
| 2006/0254936 | A1 * | 11/2006 | Corbitt et al. | 206/219 |
| 2013/0180983 | A1 * | 7/2013 | Krstic | 220/23.83 |

* cited by examiner

*Primary Examiner* — Fenn Mathew
*Assistant Examiner* — Don M Anderson
(74) *Attorney, Agent, or Firm* — William W. Haefliger

(57) ABSTRACT

The invention concerns a finger supported, openable, manually shakable container.

2 Claims, 3 Drawing Sheets

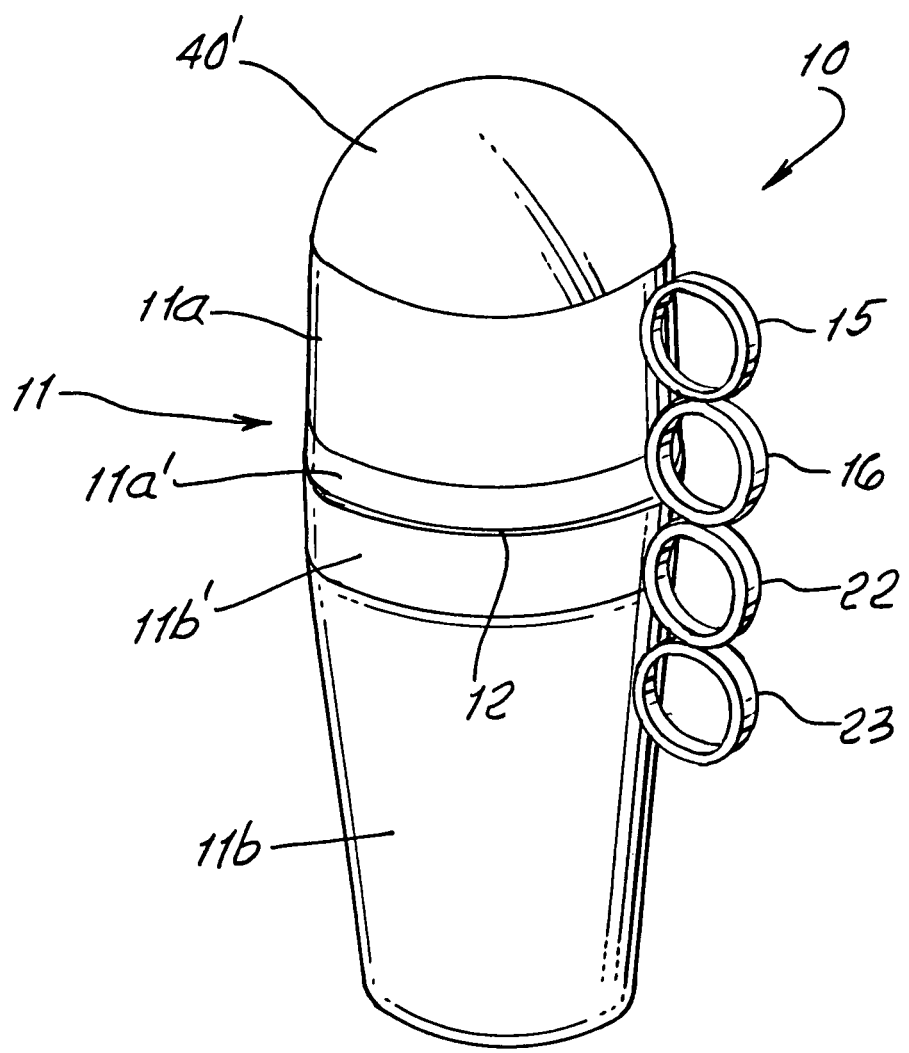

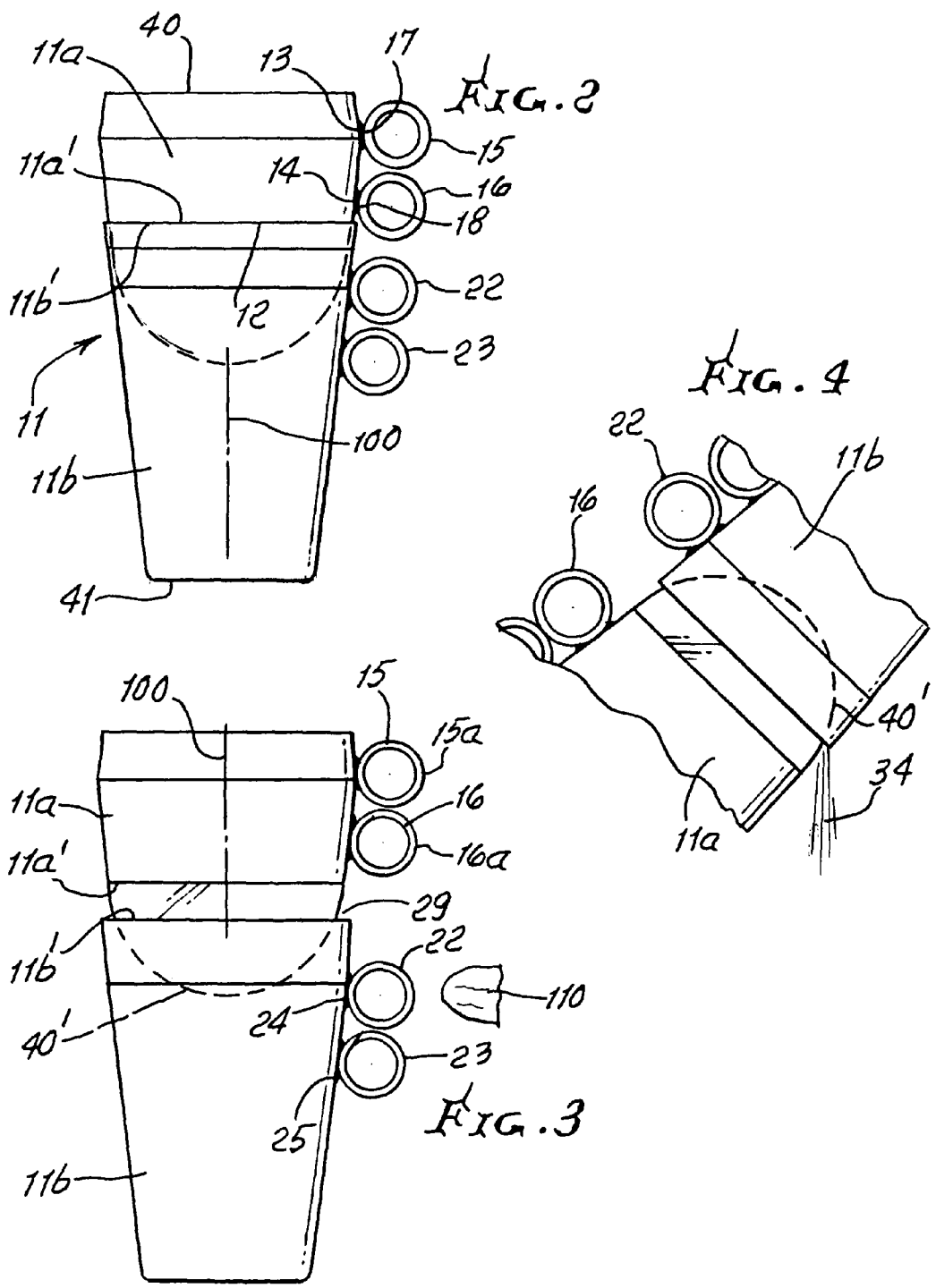

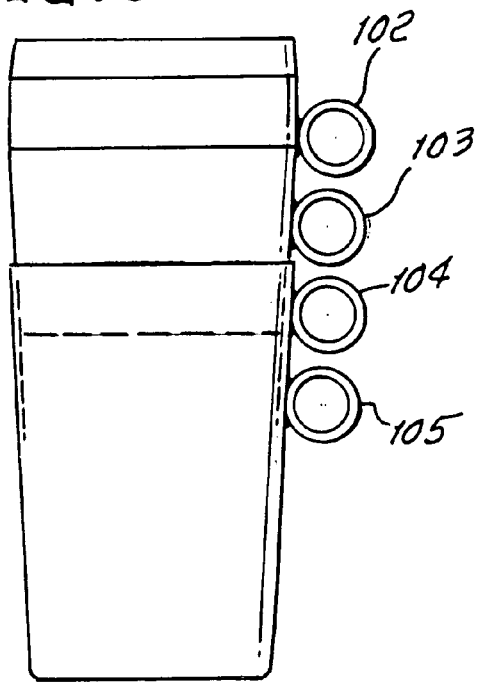
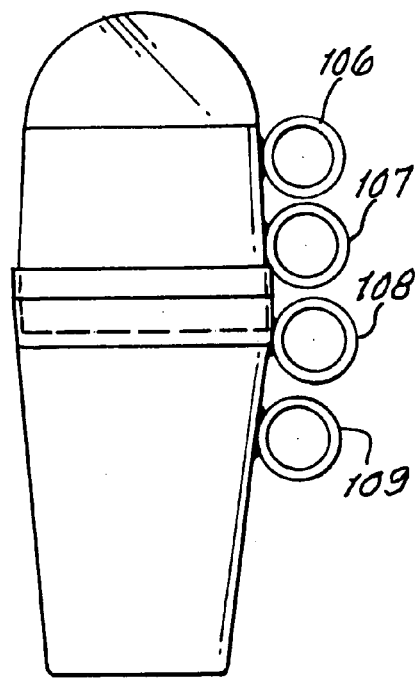
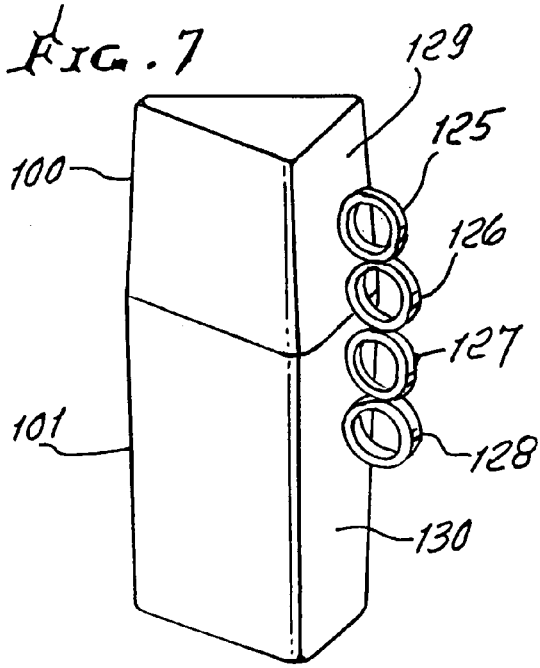
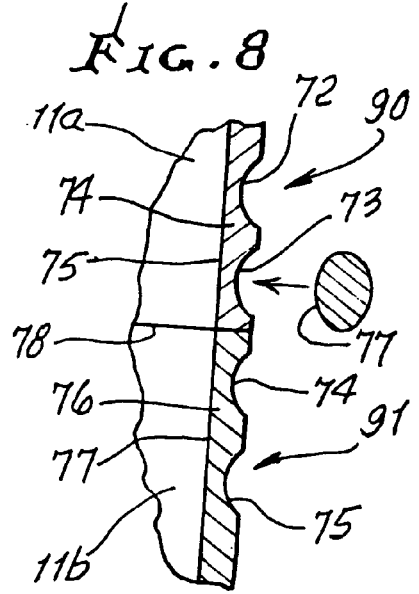

BEVERAGE MIXING CONTAINER

BACKGROUND OF THE INVENTION

This invention relates generally to the design and construction of beverage mixing containers, and more specifically concerns manually shakable containers.

There is need for mixing containers that are easy to use and shake, as well as positively grippable, to resist or prevent spillage. Also, there is need for shakable containers having the features of design, construction and operation which characterize the present invention.

SUMMARY OF THE INVENTION

It is a major object of the invention to provide an improved manually shakable beverage container characterized by:

a) container upper and lower portions with sections that interfit as at edge extents;

b) an upright row of arcuate projections attached to at least one side wall or walls of the container for reception of fingers of a user's hand, for positively gripping of the container during manual shaking. Typically, the positions of the projections attached to the upper section of the container are controllably shiftable relative to the position of the projections attached to the lower section of the container to control edge positions of the sections and a gap formed between said edge positions, thereby to further control pouring of beverage through said gap.

In this regard, the arcuate projections preferably define rings arranged in a vertical row and peripherally attached to the container side wall or walls at edges of the rings. In another form, the arcuate projections define C-shaped edges facing away from the container for ease of gripping.

Another object concerns provision of arcuate projections extending in a vertical row at the outer side of the mixing container. Such projections are preferably modified circular and define finger reception openings with cross dimensions between about 1.0 to 1.5 centimeters.

Yet another object concerns provision of such projections on the thin walls of upper and lower container sections that interfit at circular rims. As will be seen, the container sections may have other interfitting shapes, one example being triangular.

Additional objects include provision of grippable rings certain of which are interconnected at ring peripheries, adding strength to the assembly; and the rings may have the same sizes and shapes.

Yet another object includes the method of controlled mixing and pouring of a liquid beverage, which includes:

a) providing a container having projections in the form of rings, two of which are attached to the side of the container upper section and two of which are attached to the container lower section;

b) manually inserting first and second fingers through first and second rings attached to said upper section, and inserting third and fourth fingers through third and fourth rings attached to said lower section;

c) shifting the positions of the first and second rings by first and second finger movement relative to the third and fourth fingers, and thereby to control edge gap size formed by said container sections, enabling controlled pouring of the beverage through the gap; and d) shaking the container, with the gap closed, and opening the gap by finger manipulation to enable pouring.

These and other objects and advantages of the invention, as well as the details of an illustrative embodiment, will be more fully understood from the following specification and drawings, in which:

DRAWING DESCRIPTION

FIG. 1 is a perspective view showing ring positioning adjacent upper and lower sections of a shakable container;

FIG. 2 is a schematic side elevation of the FIG. 1 container, with its upper section inverted and assembled to the container lower section;

FIG. 3 is a side elevation like FIG. 2 and showing gap formation between the container inverted upper section, relative to the lower section;

FIG. 4 is a side elevation showing finger controlled relative tilting of the container sections to variably control the gap, for controlling or straining beverage flow as during pouring through the controlled gap;

FIGS. 5 and 6 are side elevation views, showing different sizes of rings;

FIG. 7 is a perspective view showing an angular container; and

FIG. 8 is a fragmentary elevation showing concave finger supports.

DETAILED DESCRIPTION

In the manually shakable beverage container assembly 10 of FIGS. 1 through 4, the container 11 has upper and lower portions 11a and 11b with rim sections $11a^1$ and $11b^1$ that telescopically interfit at 12. The sections may taper, as shown, to aid interfitting. The dome shaped container upper portion 11a has edges at 13 and 14, circular about axis 100, and arcuate projections 15 and 16 are attached at 17 and 18 to those edges. Those projections comprise upright, like rings, with peripheries 15a and 16a locally attached to container upper portion 11a as at the edges 13 and 14. Such attachments may consist of very strong adhesive. Closing top and bottom walls appear at 40 and 41.

Arcuate projections 22 and 23 directly below ring 16 are attached to the container lower portion 11b. See for example the adhesive extents 24 and 25 between the wall surface of 11b and the arcuate peripheral surfaces of the two projections 22 and 23 in the form of rings, like 15 and 16. Preferably, rings 15, 16, 22, and 23 extend in a vertical row at the sides of the vertically extending container portions 11a and 11b, to receive the row of user's four fingers of one hand. See finger 110 for example.

In FIG. 3, the section 11a has been inverted and dome $40^1$ inserted downwardly into the open upper end of 11b. Note the gap at 29 between rings 16 and 22, to prevent clashing, upon assembly of 11a into 11b.

Note also the substantially annular gap 29 created between upper rim $11b^1$ of section 11b, and the inverted dome $40^1$ of section 11a. Gap 29 is employed for pouring beverage as at 34, in FIG. 4, and acts as a beverage particle strainer. Gap 29 is controllable in width by finger controlled movement of the rings, providing ring guided control, of the container two portions, as limited by user's finger separation, during container opening, which accommodates to finger and single hand movements, as during filling, pouring and shaking.

In the form of the invention shown in FIG. 8, the arcuate projections 90 and 91 have semi-circular finger grippable concave surfaces 72-75 (see finger surface 77) facing away from the container. Surfaces 72 and 73 are formed on a support 74 securely attached at 75 to container upper portion 11a; and surfaces 74 and 75 are formed on a support 76 attached at 77 to container lower portion 11b. Line 78 indicates separate formation of 74 and 76.

FIG. 7 is like FIG. 1, but the container upper and lower portions 100 and 101 are triangular in sideward extents, and rings 125-128 are edge connected to flat side surfaces 129 and 130 of the container portions.

FIGS. 5 and 6 show rings 102-105 of smaller size than rings 106-109, to accommodate differences in finger size.

The method of controlled mixing and pouring of a liquid beverage, includes:

a) providing a container having four projections in the form of rings, two of which are aligned and attached to the side of the container upper section and two of which are aligned and attached to the container lower section;

b) manually inserting first and second fingers through first and second rings attached to the upper section, and inserting third and fourth fingers through third and fourth rings attached to the lower section;

c) shifting the positions of said first and second rings by first and second finger movement relative to said third and fourth fingers, and thereby to control an edge gap formed between the container sections, enabling controlled pouring and straining of the beverage at this gap; and d) shaking the container, with the gap closed, and opening the gap by finger ring manipulation to enable such pouring.

I claim:

1. The method of controlled mixing and pouring of a liquid beverage, which includes a) providing a container having multiple projections in the form of rings, two of which are attached to the side of the container upper section and two of which are attached to the side of the container lower section;

b) manually inserting first and second fingers through first and second rings attached to said upper section, and inserting third and fourth fingers through third and fourth rings attached to said lower section;

c) shifting the positions of said first and second rings by first and second finger movement relative to said third and fourth fingers, and thereby to control the width of an edge gap formed between said container sections, enabling controlled pouring of the beverage through this gap; and d) shaking the container, with the gap closed, and opening the gap by finger manipulation to enable such pouring.

2. The method of claim 1 wherein the rings are provided to define finger reception openings between about 1.0 and 1.5 centimeters in cross dimension.

\* \* \* \* \*